A. K. McMURRAY.
Apparatus for Collecting Natural Mineral Water and Charging Liquids with Nature's Carbonic Acid Gas.

No. 227,698.                    Patented May 18, 1880.

Witnesses:
W. B. Masson
W. E. Bowen

Inventor
Albert K. McMurray
by E. E. Masson
  atty.

United States Patent Office.

ALBERT K. McMURRAY, OF BALLSTON, NEW YORK.

APPARATUS FOR COLLECTING NATURAL MINERAL WATER AND CHARGING LIQUIDS WITH NATURE'S CARBONIC-ACID GAS.

SPECIFICATION forming part of Letters Patent No. 227,698, dated May 18, 1880.

Application filed November 1, 1879.

*To all whom it may concern:*

Be it known that I, ALBERT K. MCMURRAY, of Ballston, in the county of Saratoga and State of New York, have invented certain new and useful Improvements in Apparatus for Collecting Natural Mineral Water and Charging Liquids with Nature's Carbonic-Acid Gas; and I hereby declare that the following is a full, clear, and exact description of the same, reference being had to the accompanying drawings, making a part of this specification, in which—

Figure 1:
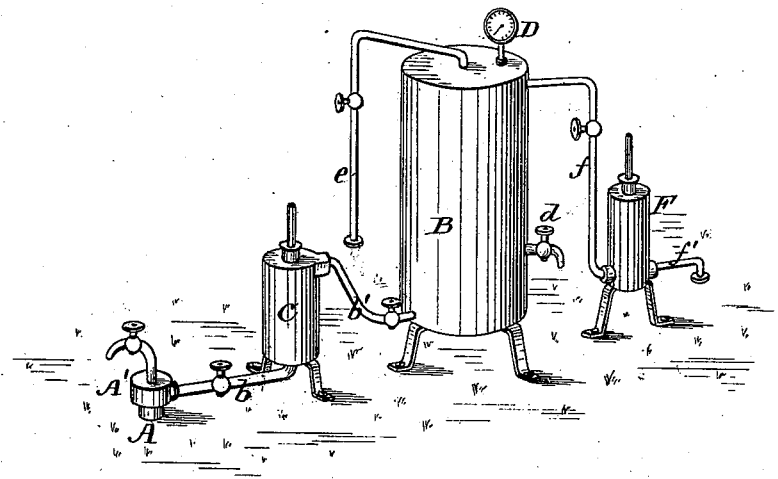
Figure 2:
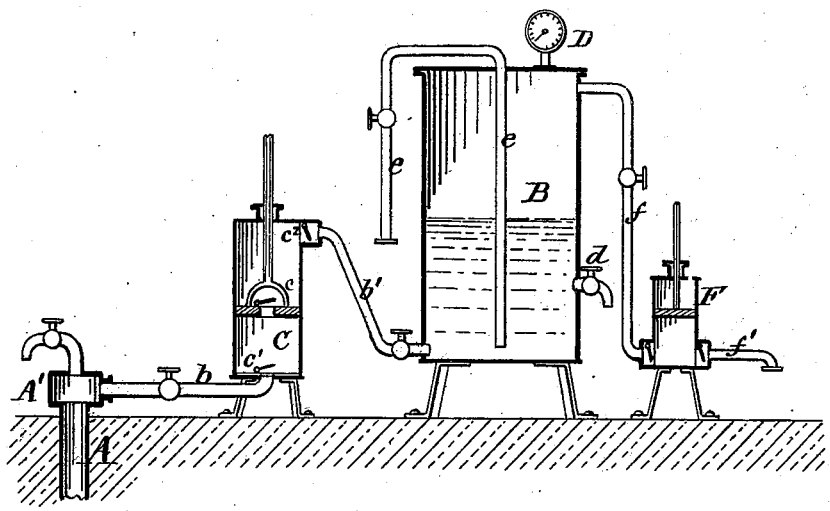

Figure 1 represents a perspective view of the apparatus. Fig. 2 represents a vertical section of the same.

Heretofore natural mineral and spring water has generally been collected by simply dipping it; or, if a well has been made, some apparatus may have been used, as shown in United States Patent No. 65,842, in which a pipe of small diameter is introduced in an open well, said pipe extending to the bottom of the well, through which the water is drawn or forced into a receiver, and an additional pipe of small diameter is conducted from a natural-gas receiver into the water of the well at a short distance under the opening of the pipe first mentioned, to force an additional quantity of gas in the water at the bottom of the well. Said patent also shows pumps whereby natural gas is designed to be charged into the water which has been drawn or forced into the receiver. When thus collected a large portion of the carbonic-acid gas contained in the water is lost, and if it is desired to give it its first gaseous appearance after having been shipped at a distance, artificial or manufactured carbonic-acid gas is forced therein before being sold or bottled, and this artificially-made gas is objectionable to many persons on account of the means and substances used for that purpose. Gaseous mineral waters thus collected lose, as soon as they issue from the earth, the molecular form and taste that they had under the internal pressure, they become stale and insipid, and cannot be restored by artificial treatment to their original composition, and many of the salts contained therein, thus relieved of pressure, having settled, are found only in the form of sediment.

The object of my invention is to retain nature's component gases and salts of mineral waters in the same condition as they are under ground and before coming in contact with the atmosphere, and also to compress said waters with an additional charge of their natural gases to make up for losses in transit, or for other purposes.

My invention consists in means for collecting nature's mineral and gaseous water with all the gases contained therein under their original pressure and charging said liquid with nature's carbonic-acid gas, said apparatus consisting of tubing fitting the bore of a drilled well and inserted in the ground over a gas and water giving spring, said tubing being properly capped and connected with a receiver by pipes leading into and from an intermediate pump, said reservoir being also provided with discharge-pipes, from which the gaseous water or the gas alone can be drawn off for present use or shipment.

The above-mentioned apparatus I have utilized in collecting and charging liquids with nature's carbonic-acid gas at the spouting-spring of "Sans-Souci," Saratoga county, New York, where a well seven hundred feet deep has been drilled and tubed, and ten gallons of water containing thirty gallons of carbonic-acid gas obtained per minute and placed in portable vessels, and thus rendered serviceable for various purposes.

The apparatus represented in the drawings consists, substantially, of the tube-well A, fitting the interior of a drilled Artesian well, and terminating in a cap, A', and a receiver, B, united thereto by block-tin-lined pipes $b$ and $b'$. One end of these pipes is attached to a pump, C, through which the water and gas can normally flow when only the normal pressure of the spouting spring-water is desired in the receiver, (the pressure from the Sans-Souci spring being about forty pounds per square inch.) But when it is desired to increase the pressure in the receiver to one hundred and eighty pounds or more per square inch to obtain a large amount of nature's carbonic-acid gas for either storing, shipping, or compressing into other mineral waters or liquids, the piston $c$ of the pump is operated by power, drawing the spouting water therein and forcing it in the receiver until the indicator D shows the desired pressure of one hundred and eighty pounds, or thereabout. For this purpose the pump is provided in its lower end with a valve, $c'$, opening inward, and a top valve, $c^2$, opening outward, while the piston is also constructed with a valve opening outward; but other styles of pumps may be used. If only a normal pressure is desired within the receiver, the pump is kept at rest, and the water simply flows past its valves into said receiver until the pressure is equibalanced.

The receiver has upon one side a cock, $d$, to draw water for bottling or for immediate use, and a siphon-pipe, $e$, having its outer extremity adapted to be coupled to portable cylinders or vessels to be filled.

To permit the natural carbonic-acid gas to be obtained and removed from the receiver and be forced in a dry gaseous form under heavy pressure in portable steel cylinders, a pipe, $f$, is attached to the top of the receiver to conduct the gas to an air-pump, F, provided with the usual valves, and from the latter, through a pipe, $f'$, into said portable cylinders.

All the connecting-pipes are provided with valves and cocks to regulate the operation of the apparatus and keep it from freezing, and so that portable cylinders can be filled either with water and gas having a normal pressure—for example, of forty pounds per square inch, or thereabout—or with water and gas and a surplus of gas, to produce therein a pressure of one hundred and eighty pounds or more, or with gas alone having any desired pressure. The portable cylinders can then be shipped and the contents used as an agreeable beverage, also in bread-making and for other purposes.

Having now fully described my invention, I claim—

1. An apparatus for collecting natural mineral and gaseous water with all the gases contained therein under their original or an increased pressure, consisting of capped tubing fitting the bore of a well and inserted in the ground over a gas and water giving spring, and a receiver with a pipe leading from said tubing into a pump, and from the latter into said receiver, from which the water is to be removed by pipes, substantially as described.

2. An apparatus for collecting natural mineral and gaseous water and charging the same or other liquids with nature's carbonic-acid gas, composed of a tubed and capped well, a receiver, pipes to unite them, and an air-pump having a delivery-pipe, and connected with the top of said receiver by a pipe to remove from the latter nature's carbonic-acid gas, substantially as described.

ALBERT K. McMURRAY.

Witnesses:
E. E. MASSON,
W. B. MASSON.